(12) United States Patent
Kelly et al.

(10) Patent No.: US 12,286,223 B2
(45) Date of Patent: *Apr. 29, 2025

(54) AIRCRAFT WING SECTION ASSEMBLY

(71) Applicant: AIRBUS OPERATIONS LIMITED, Bristol (GB)

(72) Inventors: Mark Shaun Kelly, Bristol (GB); Peter Kelly, Bristol (GB); Stuart Strachan Alexander, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 9 days.

This patent is subject to a terminal disclaimer.

(21) Appl. No.: 18/494,280

(22) Filed: Oct. 25, 2023

(65) Prior Publication Data

US 2024/0132199 A1   Apr. 25, 2024
US 2024/0228013 A9   Jul. 11, 2024

Related U.S. Application Data

(63) Continuation of application No. 17/665,897, filed on Feb. 7, 2022, now Pat. No. 11,834,171.

(30) Foreign Application Priority Data

Feb. 8, 2021 (GB) .................................. 2101729

(51) Int. Cl.
*B64C 3/50* (2006.01)
*B64C 3/14* (2006.01)
(Continued)

(52) U.S. Cl.
CPC ............. *B64C 3/50* (2013.01); *B64C 3/48* (2013.01); *B64U 10/25* (2023.01); *B64U 30/12* (2023.01); *B64U 40/10* (2023.01)

(58) Field of Classification Search
CPC ....... B64C 3/50; B64C 3/48; B64C 2003/142; B64C 3/44
See application file for complete search history.

(56) References Cited

U.S. PATENT DOCUMENTS 1,813,485 A   7/1931 Cook
2,650,047 A * 8/1953 Stoner ...................... B64C 3/48
                                                    244/214

(Continued)

FOREIGN PATENT DOCUMENTS

EP   2 860 602 A2   4/2015
FR     655 603 A    4/1929

(Continued)

OTHER PUBLICATIONS

Combined Search and Examination Report for GB 2101729.8, dated Nov. 25, 2021, 7 pages.

(Continued)

*Primary Examiner* — Brian M O'Hara
(74) *Attorney, Agent, or Firm* — Nixon & Vanderhye P.C.

(57) ABSTRACT

An aircraft wing section assembly is disclosed having a structural spine, a movement mechanism including a support rod 1 extending through the structural spine, a first lever, for connection to and for moving a first moveable control surface, pivotally mounted to the support rod, a second similar lever for connection to and for moving a second moveable control surface, and a connection mechanism for connecting the first and second levers such that pivotal movement of the first lever causes pivotal movement of the second lever, and an actuation mechanism for actuating pivotal movement of the first lever, such that, in use, when the actuation mechanism actuates pivotal movement of the first lever, the second lever also pivotally moves, thus causing movement of both the first and second moveable (Continued)

control surfaces. Also disclosed is an aircraft wing assembly, an aircraft and a method of operating an aircraft.

24 Claims, 6 Drawing Sheets

(51) Int. Cl.
*B64C 3/48* (2006.01)
*B64U 10/25* (2023.01)
*B64U 30/12* (2023.01)
*B64U 40/10* (2023.01)

(56) References Cited

U.S. PATENT DOCUMENTS

| | | | |
|---|---|---|---|
| RE24,099 E * | 12/1955 | Maxwell | B64C 3/50 244/211 |
| 3,026,067 A * | 3/1962 | Grant | B64C 9/22 244/91 |
| 3,127,130 A | 3/1964 | Lyon | |
| 4,012,013 A * | 3/1977 | Ball | B64C 3/48 137/15.1 |
| 4,429,844 A | 2/1984 | Brown et al. | |
| 7,530,533 B2 | 5/2009 | Perez-Sanchez | |
| 7,699,270 B2 | 4/2010 | Lonsinger et al. | |
| 2010/0133387 A1 | 6/2010 | Wood et al. | |
| 2018/0043985 A1 | 2/2018 | Thompson | |
| 2024/0017816 A1 * | 1/2024 | Li | B64C 33/02 |
| 2024/0228013 A9 * | 7/2024 | Kelly | B64U 10/25 |

FOREIGN PATENT DOCUMENTS

| | | | | |
|---|---|---|---|---|
| GB | 371442 A | | 4/1932 | |
| WO | WO-2022104769 A1 * | | 5/2022 | B64C 3/385 |

OTHER PUBLICATIONS

Extended European Search Report for Application No. 22153145.2, seven pages, dated Jun. 8, 2022.

* cited by examiner

AIRCRAFT WING SECTION ASSEMBLY

CROSS REFERENCE TO RELATED APPLICATIONS

This application is a Continuation of U.S. patent application Ser. No. 17/665,897, filed Feb. 7, 2022, now allowed; which claims priority to United Kingdom Patent Application GB 2101729.8, filed Feb. 8, 2021, the entire contents of each of which are hereby incorporated by reference.

BACKGROUND OF THE INVENTION

The present disclosure relates to an aircraft wing section assembly.

The present invention concerns aircraft wing section assemblies. More particularly, but not exclusively, this invention concerns an aircraft wing section assembly comprising a structural spine extending in a spanwise direction of the wing section.

The invention also concerns an aircraft wing assembly, an aircraft and a method of operating an aircraft.

Aircraft are provided with ailerons to control roll movement of the aircraft. These are typically located on the trailing edges of the wings, and often at a location towards the tip of the wings. For example, on a port wing, a trailing edge aileron may be controlled to pivot downwards in relation to the rest of the wing to provide additional lift (upwards force) to the wing and to roll the aircraft clockwise (when looking at the aircraft from the front). At the same time, on the starboard wing, the trailing edge aileron may be controlled to pivot upwards in relation to the rest of the wing to provide downwards force to the wing and to roll the aircraft clockwise. The ailerons may also be used to alleviate gust loading on the aircraft.

However, for high aspect ratio (wing span divided by mean chord) wings (i.e. long and slender wings with an aspect ratio of 12 or more) that are torsionally flexible or where the ailerons are located very near the tip of the wing, there can be a lot of deformation of the wing when the ailerons are moved. For example, if the aileron is moved upwards, this could cause the rest of the wing to also flex or twist in such a way that negates the aileron effect wishing to be achieved. In fact, a resultant negative or adverse effect may be achieved (known as aileron reversal).

Further, increasing the span of the aileron increases its slenderness and this leads to further twisting of the aileron and reduces its effectiveness. On the other hand, if the aileron is split into multiple, shorter ailerons, this increases the complexity, cost and weight. This may also allow less space for the flaps of the wing.

However, high aspect ratio wings are important as they reduce induced drag and so increase fuel burn efficiency, and so reduce operating costs and environmental impact.

In addition, in high aspect ratio wings, there is often little space in the wing for the actuation mechanism of the ailerons. This may mean that fairings are used to create additional volume, but this increases profile drag of the wing.

This issue could be addressed by using flaperons—i.e. control surfaces that can act as both flaps and also ailerons. This gives more roll moment, when needed. However, these flaperons are then less optimised for use as flaps and take up space that could be used by flaps, meaning the wing overall is less efficient.

The present invention seeks to mitigate the above-mentioned problems. Alternatively or additionally, the present invention seeks to provide an improved aircraft wing section assembly.

SUMMARY OF THE INVENTION

The present invention provides, according to a first aspect, an aircraft wing section assembly comprising a structural spine extending in a spanwise direction of the wing section, a movement mechanism comprising a support rod extending in a chordwise direction of the wing section, through the structural spine, from a first end to a second end, a first lever, for connection to and for moving a first moveable control surface, pivotally mounted to the first end of the support rod, for pivotal movement with respect to the support rod, a second lever, for connection to and for moving a second moveable control surface, pivotally mounted to the second end of the support rod, for pivotal movement with respect to the support rod, and a connection mechanism for connecting the first and second levers such that pivotal movement of the first lever with respect to the support rod causes pivotal movement of the second lever with respect to the support rod, and an actuation mechanism for actuating pivotal movement of the first lever with respect to the support rod, such that, in use, when the actuation mechanism actuates pivotal movement of the first lever with respect to the support rod, the second lever also pivotally moves with respect to the support rod, thus causing movement of both the first and second moveable control surfaces. In embodiments, the pivotal movement of the second lever with respect to the support rod is caused by interconnection of the connection mechanism between the first lever and the second lever. Therefore, in operation of such embodiments and when the connection mechanism is connected to the first and second levers, pivotal movement of the first lever with respect to the support rod causes movement of the connection mechanism with respect to the support rod, wherein the movement of the connection mechanism causes pivotal movement of the second lever with respect to the support rod.

In the above and below, "extending in a spanwise/chordwise direction" means extending with at least a component in that direction. It does not require for the direction to be exactly parallel with the span or chord of the wing or wing section.

The aircraft wing section assembly may comprises only a small spanwise section of an aircraft wing and may only comprise a structural portion of the section.

The structural spine may extend from a root portion to a tip portion of the wing section.

The first moveable control surface may be a leading or trailing edge cambering device (similar to an aileron), which is controlled to move by the first lever. The second moveable control surface may be a leading or trailing edge cambering device, which is controlled to move by the second lever. The first moveable control surface may be a trailing edge cambering device and the second moveable control surface may be a leading edge cambering device.

These cambering devices may provide roll control to the aircraft. For example, on a port wing, the leading and trailing edge cambering devices may be controlled to pivot downwards in relation to the rest of the wing to provide additional lift (upwards force) to the wing and to roll the aircraft clockwise. At the same time, on the starboard wing, the leading and trailing edge cambering devices may be controlled to pivot upwards in relation to the rest of the wing to provide downwards force to the wing and to roll the aircraft clockwise. A roll responsiveness of from −30 degree to +30 degrees in 7 seconds may be required. The cambering devices may also be used to alleviate gust loading on the aircraft.

It is helpful to have both the leading and trailing edge cambering devices on the wing.

This is especially important for high aspect ratio (long and slender) wings and/or where the aileron (at the trailing edge) is located very near the tip of the wing. This is because, if the aileron is located a long way from the wing root and/or if the wing is very flexible (torsionally), there can be a lot of deformation of the wing when the aileron is moved. For example, if the aileron is moved upwards, this could cause the rest of the wing to also flex or twist such that it negates the aileron effect wishing to be achieved. In fact, a resultant negative or adverse effect may be achieved (known as aileron reversal).

Having a leading edge cambering device as well (as a trailing edge aileron or cambering device) balances the change in camber of the whole wing chord and so can ensure aileron reversal does not happen. Furthermore, the leading edge provides additional roll control surface. This means that the cambering devices may be shorter and take up less space along the span of the wing. This gives more space for flaps on the wing, for example, and allow the wing to be better optimised.

The first and second levers may be directly or indirectly pivotally mounted to the support rod.

Such an arrangement provides a compact and lightweight way of actuating both first and second levers at the same time. This could be used to actuate a leading and trailing edge cambering device at the same time. This is especially useful in a tip portion of a wing, and especially of a high aspect ratio wing, where space is limited but where significant cambering device control surface is required in order to provide the required control movement (e.g. amount of roll required) and rate of movement (e.g. a required roll rate for certification and pilot handling) for the aircraft.

In addition, having the first and second levers connected through the support rod, allows the hinge moments on the levers to counteract each other and provide an efficient structure to deal with the loads experienced. This is especially helpful as the hinge moments of the leading and trailing edge cambering device surfaces will typically be in opposing directions. Hence, the support rod may take a significant part of the hinge load between the leading and trailing edge surfaces (or other moveable controls surfaces) and reduce the transverse load into the wing structure.

The structural spine may comprise a box structure. It may have a rectangular cross-sectional area. The cross-section may be between 4 mm (e.g. for a micro drone) and 4 m (e.g. for a large passenger aircraft such as the A380) high. The chord/width may be between 40 mm (e.g. for a micro drone) and 20 m (e.g. for a large passenger aircraft such as the A380). The height to chord ratio may be between 0.05 and 0.30.

Preferably, the structural spine comprises a monolithic box structure.

The box structure may be formed of composite material. A monolithic box structure is an especially efficient structure. Composite material enables the box structure to be lightweight. Having a relatively small and efficient box structure, enables the leading and trailing edge cambering devices to be bigger and so provide more control surface area. It also reduces manufacturing cost (due to reduced fasteners, drilling, assembly etc.).

It is desirable that the support rod extends through the structural spine at a central (height-wise) location on the box structure. This is the "neutral axis" of the cross-section for upwards/downwards bending. This is because this part of the box structure is less load bearing (the load mainly being taken by the top and bottom).

Preferably, the support rod comprises an elongate section extending internally through the structural spine between the first and second ends, wherein the first end comprises a first end stopper located adjacent to a first external side of the structural spine for preventing the first end from moving in a first direction through the first side, and wherein the second end comprises a second end stopper located adjacent to a second, opposite external side of the structural spine for preventing the second end from moving in a second direction, opposite to the first direction, through the second side.

Hence, the stoppers collectively prevent the support rod from moving in relation to the structural spine. Both tension loads and compression loads can be passed through the rod. This enables hinge moments on the levers to counteract each other through the support rod and provide an efficient structure to deal with the loads experienced.

The support rod may be configured to take tension and compression. Alternatively, or additionally, it may be pre-tensioned.

Preferably, the actuation mechanism comprises a cable connected to the first lever at a first cable connection point, the cable being connected to a pull mechanism for pulling the cable such that the first cable connection point moves.

Such a mechanism is lightweight and efficient for the loads required. This is because the cable only needs to take a tension force, and so is lighter than a rod, that would also need to take compression.

Alternatively, the actuation mechanism may comprise a linear actuator, such as a screw actuator, the linear actuator connected to the first lever at a first actuator connection point.

More preferably, the actuation mechanism further comprises a pulley and wherein the cable extends around the pulley.

Even more preferably, the cable is also connected to the first lever at a second cable connection point.

This provides double the moment on the first lever for the same pull force on the cable. Hence, this further adds to the efficiency of the mechanism.

Even more preferably, the second cable connection point is on an opposite side of the pulley to the first cable connection point.

Hence, when the cable is pulled, the first cable connection point moves in a first direction and the second cable connection point moves in a second opposite direction.

Preferably, the actuation mechanism comprises a crank lever, mounted to the first lever such that it extends transverse to the first lever and wherein the first cable connection point is located on a first end of the crank lever, to a first transverse side of the first lever.

More preferably, the second cable connection point is located on a second opposite end of the crank lever, to a second, opposite transverse side of the first lever.

Preferably, the connection mechanism comprises at least one connector extending in a chordwise direction of the wing section, through the structural spine.

The at least one connector may be spaced from the support rod (also extending in a chordwise direction of the wing section, through the structural spine) in a spanwise direction.

For example, the connector may be a rod or a cable.

More preferably, the connection mechanism comprises a second connector extending in a chordwise direction of the wing section, through the structural spine.

This second connector may be spaced from the support rod in a spanwise direction, on an opposite side to the first connector.

Having two connectors allows each connector to only have to take a tension force and so the first and second connectors can be cables. This means the connection mechanism can be lightweight. It also enables the holes in the structural spine (needed to allow the cables to pass though) to be very small as the thickness of the cables are small.

If there is only one connector, this has to be a rod, capable of taking compression as well as tension and so needs a bigger hole (but half the quantity of holes).

The connector(s) are preferably connected to ends of the first and second levers. This increases the moment between the connector(s) and the first and second levers.

It is desirable that the connector(s) extend through the structural spine at a central (height-wise) location on the box structure. This is because this part of the box structure is less load bearing (the load mainly being taken by the top and bottom).

Preferably, the first lever is part of a first lever mechanism for connection to the first moveable control surface, and wherein the first lever mechanism also comprises a connecting link pivotally mounted to the first lever at a connecting link connection point.

Similarly, the second lever is part of a second lever mechanism for connection to the second moveable control surface, and wherein the second lever mechanism also comprises a second connecting link pivotally mounted to the second lever at a connecting link connection point.

More preferably, the connecting link connection point is closer to the point of pivotal mounting of the first lever to the support rod than the location of the first cable connection point.

This provides a greater moment arm for the cable, about the pivot point of the first lever, compared to the connecting link. This means that less cable force and movement is required to move the connecting link (and moveable control surface).

If, instead of a cable, a linear actuator is used, the connecting link connection point may be closer to the point of pivotal mounting of the first lever to the support rod than the location of the first actuator connection point. This means that less actuator force and movement is required to move the connecting link (and moveable control surface).

Preferably, the first lever mechanism further comprises a D-shaped crank pivotally connected to the structural spine and connected to the connecting link such that movement of the connecting link causes the D-shaped crank to pivot with respect to the structural spine.

The first moveable control surface may be mounted on the D-shaped crank and so pivots with the D-shaped crank. The D-shaped crank may be directly or indirectly connected to the structural spine.

Similarly, the second lever mechanism further comprises a second D-shaped crank pivotally connected to the structural spine and connected to the second connecting link such that movement of the second connecting link causes the D-shaped crank to pivot with respect to the structural spine. The second moveable control surface may be mounted on the second D-shaped crank and so pivots with the second D-shaped crank.

The second D-shaped crank may be directly or indirectly connected to the structural spine.

Preferably, there are a plurality of movement mechanisms spaced apart along the structural spine. This distributes the hinge moment load across multiple actuation connection points along the span of the control surface and therefore reduces the internal structural reinforcement required on the control surface (for example, in the form of cross/diagonal ribs) to prevent twisting. This is especially important to prevent twisting of a long and slender trailing edge aileron/cambering device, that otherwise might occur if using two actuator connection points positioned closely together near the inboard end of the aileron due to spacing constraints.

There may be 3, or as many as 5 or 6, movement mechanisms. The movement mechanisms may be spaced apart along the span of the structural spine.

Having a plurality of movement mechanisms minimises moveable control surface (cambering device) twisting and means a lighter, less structurally robust design is needed. This is especially important for a trailing edge moveable control surface where structural cross sections are typically thin. Reducing the loads on each movement mechanism can reduce the weight of the movement mechanism and associated connection lugs on the control surface.

Each movement mechanism is controlled and moved by the same actuation mechanism. In other words, the actuation mechanism is capable of moving all first and second levers.

Preferably, the aircraft wing section assembly further comprises a first moveable control surface connected to the first lever and a second moveable control surface connected to the second lever, wherein one or both of the moveable control surfaces comprise a flexible skin adjacent to connection of the surface to the lever.

This provides a smooth aerodynamic surface, even when the moveable surface has been moved to an extreme position by the first or second lever. The flexible skin may be formed of carbon fibre.

According to a second aspect of the invention there is also provided an aircraft wing assembly including the aircraft wing section assembly as described above, wherein the aircraft wing section assembly is located at a tip portion of the aircraft wing assembly.

Preferably, the aircraft wing assembly comprises a foldable wing tip portion and wherein the aircraft wing section assembly is located in the foldable wing tip portion, such that it is located outboard of the fold. Having a foldable wing tip portion allows the wing span to be large but still be able to be folded to fit into the ground space available.

The pull mechanism may be located outboard of the fold.

Alternatively, the pull mechanism is located inboard of the fold, and wherein the pull mechanism includes a cable link transfer mechanism to transfer movement of a cable inboard of the fold into movement of the cable outboard of the fold.

The span of the foldable wing tip portion may be a significant proportion of the overall wing span. For example, it might have a span of approximately 10 m (each side) compared to an overall wing span of 56 m, to fit an airport gate envelope of 36 m wide.

According to a third aspect of the invention there is also provided an aircraft comprising the aircraft wing section assembly or aircraft wing assembly as described above.

The aircraft may have a high aspect ratio wing. For example, the span of the wing may be more than 40 m and maybe more than 50 m long. The aspect ratio of the wing may be more than 12, maybe more than 14, and maybe more than 16.

According to a fourth aspect of the invention there is also provided a method of operating an aircraft, the aircraft being as described above.

According to a fifth aspect of the invention there is also provided a method of operating an aircraft, comprising the following steps providing a wing section with a structural spine extending in a spanwise direction of the wing section, providing a support rod extending in a chordwise direction of the wing section, through the structural spine, from a first end to a second end, actuating an actuation mechanism, thereby causing a first lever to pivot with respect to the support rod, thereby causing a first moveable wing control surface connected to the first lever to move, and a connection mechanism, connected to the first lever and a second lever, to move, thereby causing the second lever to pivot with respect to the support rod, thereby causing a second moveable wing control surface connected to the second lever to move.

It will of course be appreciated that features described in relation to one aspect of the present invention may be incorporated into other aspects of the present invention.

For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
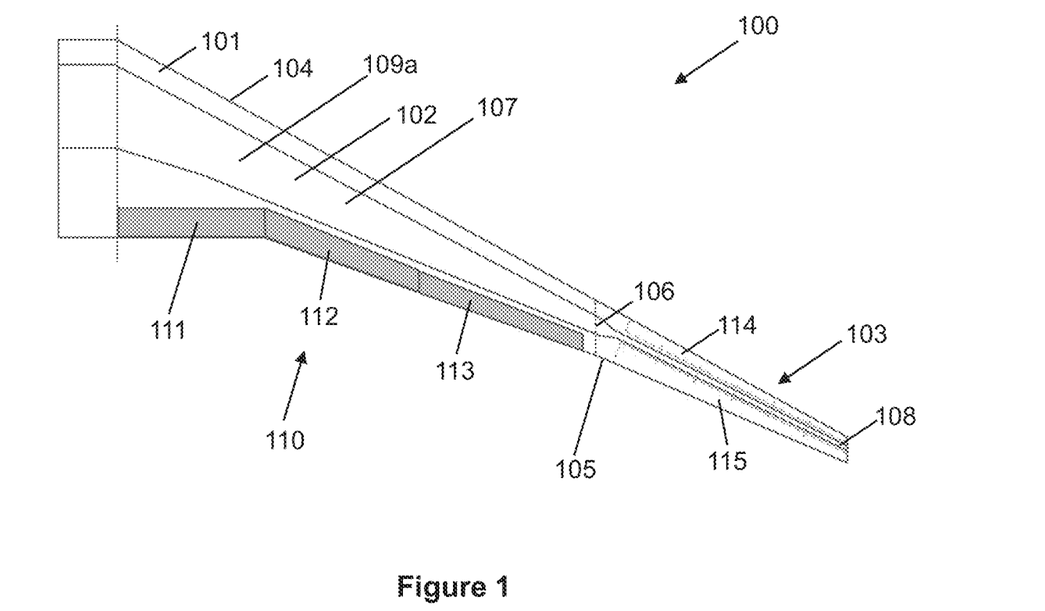
FIG. 1 shows a plan view of a wing according to a first embodiment of the invention.

FIG. 1 shows a plan view of a wing 100 according to a first embodiment of the invention.

The wing 100 has a relatively large aspect ratio (span divided by mean chord). This aspect ratio is 16, with a span of 52 m. The wing comprises a root portion 101, a main portion 102 and a tip portion 103. The tip portion 103 is a foldable wing tip, foldable in relation to the main portion 102 at fold line 106. The wing has a leading edge 104 and a trailing edge 105.

The root portion 101 and main portion 102 are provided with a structural wing box 107. In the tip portion 103, the main load-bearing structure is provided by a structural spine, labelled as 108. The wing 100 also has a wing skin 109, with the upper wing skin 109a being seen in FIG. 1. There is also a lower wing skin 109b on the underside of the wing.

Various moveable control surfaces 110 are provided on the wing 100. These are inboard flap 111, intermediate flap 112 and outboard flap 113 in the root and main portions of the wing, and leading edge cambering device 114 and trailing edge cambering device 115 in the tip portion 103.

Figure 2A:
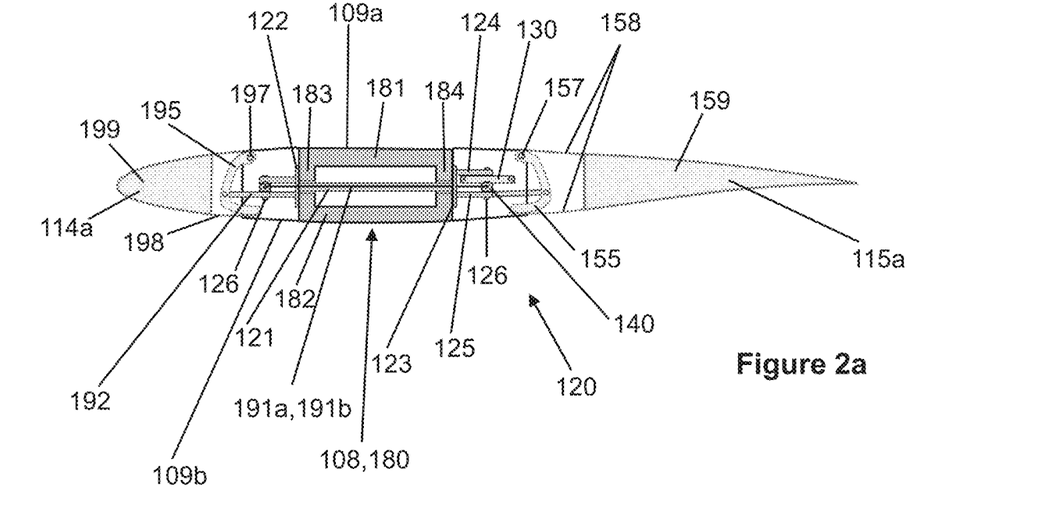
FIG. 2a shows a cross-sectional side view of a tip portion of the wing of FIG. 1, with leading and trailing edge cambering devices in a neutral configuration.

FIG. 2a shows a cross-sectional side view of a tip portion 103 of the wing of FIG. 1, with leading 114 and trailing 115 edge cambering devices in a neutral configuration, labelled as 114a and 115a respectively.

Here, it can be seen that the structural spine 108 is in the form of a monolithic box structure 180, with a top 181, bottom 182 and leading and trailing sides 183, 184 respectively. The box 180 is 6 cm high (i.e. the length of sides 183, 184) and is 12 cm wide (i.e. the length of top and bottom 181, 182). The box 180 is chord-wise located within the wing tip 103 so as to achieve similar load magnitudes between the leading and trailing sides, to reduce torsional stress on the box 180.

Figure 2B:
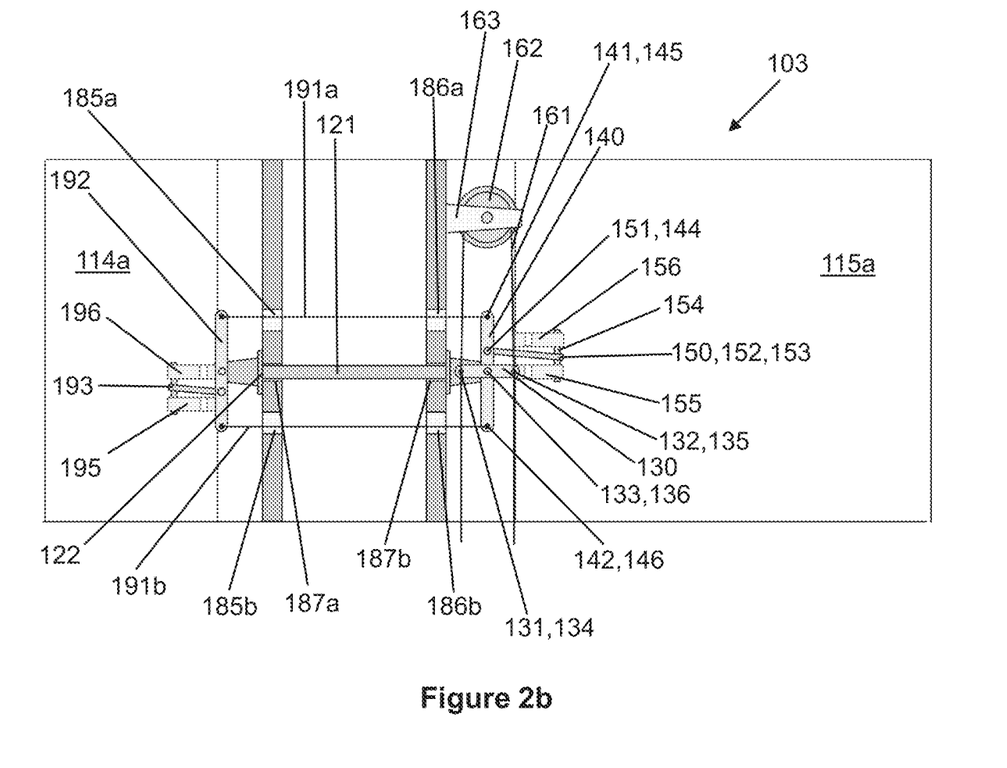
FIG. 2b shows a cross-sectional plan view of the tip portion of FIG. 2a, showing a movement mechanism for moving the leading and trailing edge cambering devices.

FIG. 2b shows a cross-sectional plan view of the tip portion 103 of FIG. 2a, showing a mechanism 120 for moving and supporting the leading and trailing edge cambering devices 114, 115.

Here, it can be seen that there are various holes in the sides 183, 184 of the box 180. In particular, there is a hole in each of the sides 183, 184 (the holes labelled 187a and 187b respectively) for a support rod 121 which extends in the chordwise direction of the wing, through the structural spine 108. Importantly, it does this at a central height of the monolithic box 180, as can be seen in FIG. 2a. It is at this central height that the box 180 bears minimal load and hence, the holes have minimal effect on the efficiency of the box structure 180. This is because the load is mainly being taken by the top 181 and bottom 182.

The support rod 121 comprises a leading stopper 122 and a trailing stopper 123. These are located outside of the leading and trailing sides 183, 184 of the box 180 respectively and are attached to the sides 183, 184 by nuts and bolts (not shown). (Alternatively, they could be attached with adhesive, rivets, co-curing, tension fitting using screw thread etc.) They ensure that the support rod 121 is fixed in place in relation to the box 180 and allows the support rod 121 to transmit a tension load and a compression load between the stoppers 122, 123. Hence, part of the hinge-moment load on the stoppers 122, 123 (from the movement mechanism 120, which will be described later) can be transferred through the support rod 121. In other words, the support rod 121 allows hinge moments on the leading and trailing edge cambering devices 114, 115 to counteract each other and provide an efficient structure to deal with the loads experienced.

On each of the stoppers is a top lug 124 and a bottom lug 125 extending horizontally away from the box 180. These lugs 124, 125 mount a vertical pivot rod 126 extending between the lugs. The leading and trailing pivot rods 126 are used to mount two parts (leading part and trailing part) of the movement mechanism 120 that enable the leading and trailing edge cambering devices 114, 115 to be moved.

On either side of the holes 187a and b (in the spanwise direction) are two further holes in each side 183, 184 of the box 180. The two holes in the leading side are labelled 185a and 185b. The two holes in the trailing side are labelled 186a and 186b. These holes allow steel cables 191a and 191a to extend through the box 180 to connect the leading and trailing parts of the movement mechanism 120, as will be described later. (Alternatively, the cables could be made of any other suitable material, such as carbon fibre.) This connection allows the leading and trailing edge cambering devices 114, 115 to be moved simultaneously. Importantly, as before, the holes 185a, 185b, 186a, 186b are at a central height of the monolithic box 180, as can be seen in FIG. 2a. When viewed head on, the shape of these holes may be in the form of an elongate slot with a longer width than height to accommodate for the displacement of the cable in the spanwise direction due to the kinematics of the mechanism.

The trailing part of the movement mechanism 120 will now be described. The trailing part comprises a number of linked elements.

Firstly, a first crank lever 130 in the form of a short straight lever is pivotally mounted on the trailing pivot rod 126, so that it pivots around the vertical pivot rod 126. It is pivotally mounted at a central point location 133 at pivot point 136. The crank lever 130 has a first end 131, and second opposite end 132. Each end 131, 132 has a cable-mounting point 134, 135. These cable-mounting points 134, 135 attach to a moveable steel cable 161 of a cable mechanism 160, which will be described later. Movement of the cable 161 causes movement of the cable-mounting points 134, 135 and thus pivots the first crank lever 130 about the pivot point 136.

A central location 143 of a second straight crank lever 140 is fixedly attached to the first crank lever 130 at its central location 133, so as to form a perpendicular cross shape that pivots in relation to the pivot rod 126 at the pivot point 136. Hence, as the first crank lever 130 pivots about 136 (because of cable 161 being moved), the second crank lever 140 also pivots about 136. The second crank lever 140 is longer than the first crank lever 130. The second crank lever 140 has a first end 141 and second opposite end 122. Each end 141, 142 has a cable-mounting point 145, 146. These cable-mounting points 145, 146 attach to cables 191a and 191b so as to connect the movement of the second crank lever 140 to the leading part of the movement mechanism, as will be described later.

In addition, at an intermediate location 144 on the second crank lever 140 there is a connecting link 150 pivotally mounted to the second crank lever 140. The intermediate location 144 is located apart from the central pivot point 143 of the lever 140 (or 136) but nearer to it in plan view, than either of the cable-mounting points 134, 135 on the first crank lever 130. This means that the movement of the cable 161 that causes movement of cable-mounting points 134, 135 has a bigger moment arm in relation to the pivot point 136 of the crank levers 130, 140 than the intermediate location 144. In fact, intermediate location 144 is located approximately half the distance from the pivot point 136 as the cable mounting points 134, 135. This means that the force (from the cable 161) needed at cable-mounting points 134, 135 to move the cranks 130, 140 is less than the force experienced by the intermediate location 144/connecting link 150. In addition, as the cable 161 loops around pulley 162 it exerts forces in opposing directions at the cable mounting points 134 and 135 such that the moment around pivot 136 is doubled. This further increases the leverage of the cable 161 over the connecting links 151 and 193. As the first 130 and second 140 crank levers pivot, the intermediate location 144 moves towards and away from the trailing side 184 of the box 180.

The connecting link 150, as mentioned above, is pivotally connected to the intermediate location 144 of the second crank lever 140. This is at a first end 151 of the connecting link. The second opposite end 152 of the connecting link (which extends towards the trailing edge cambering device 115) is pivotally mounted to a pivot bar 154 at pivot point 153. Hence, as the connecting link 150 is pulled into and pushed away from the trailing side 184, by the second crank lever 140, the pivot bar 154 is also pulled into and pushed away from the trailing side 184.

The pivot bar 154 extends between two D-shaped cranks 155, 156. As can be seen in FIG. 2a, an upper portion of each D-shaped crank (only crank 155 seen) is pivotally mounted at pivot point 157 to the trailing edge of upper wing skin 109a. This pivot point 157 is above the pivot point 153 of the pivot bar 154. Hence, when the pivot point is pushed towards the trailing edge cambering device 115, the D-cranks 155, 156 pivot upwards and vice versa. The trailing edge cambering device 115 is mounted to the D-cranks 155, 156 and so when they pivot at 157, the trailing edge cambering device 115 also pivots. It is noted that on the upper and lower wing skins of the trailing edge cambering device 115, at a region adjacent the rest of the tip portion 103, are flexible sections of skin made out of CFRP (by winding fibres), denoted by label 158. The rest of the cambering device 115 comprises a fixed internal structure 159. The flexible skins of the cambering devices 114, 115 that are on the lower surface (i.e. furthest away from the pivots of the D-cranks) are disjoint from the lower surface skins of the wing tip portion 103. As the D-cranks pivot to place the cambering devices in the downward configuration, the "excess" flexible skin of the cambering devices 114, 115 slides inside the wing cavity such that it is not exposed to the airflow. The flexible lower skin of each cambering device is attached only at the lower-inner corner of the D-crank, such that the remaining chordwise length of flexible skin is able to separate from the lower surface of the D-crank in the upward configuration. In the downward configuration, a chordwise length of the lower skin of the cambering device that is not attached to the D-crank will be drawn flush to the lower surface of the D-crank. Part of the D-crank is shaped to follow the arc of a circle around the D-crank pivot in order to maintain a constant gap between the lower flexible skin of the cambering devices 114, 115 and the skin of the wing tip portion 103 as the mechanism moves between the upward and downward configurations.

Figure 6:
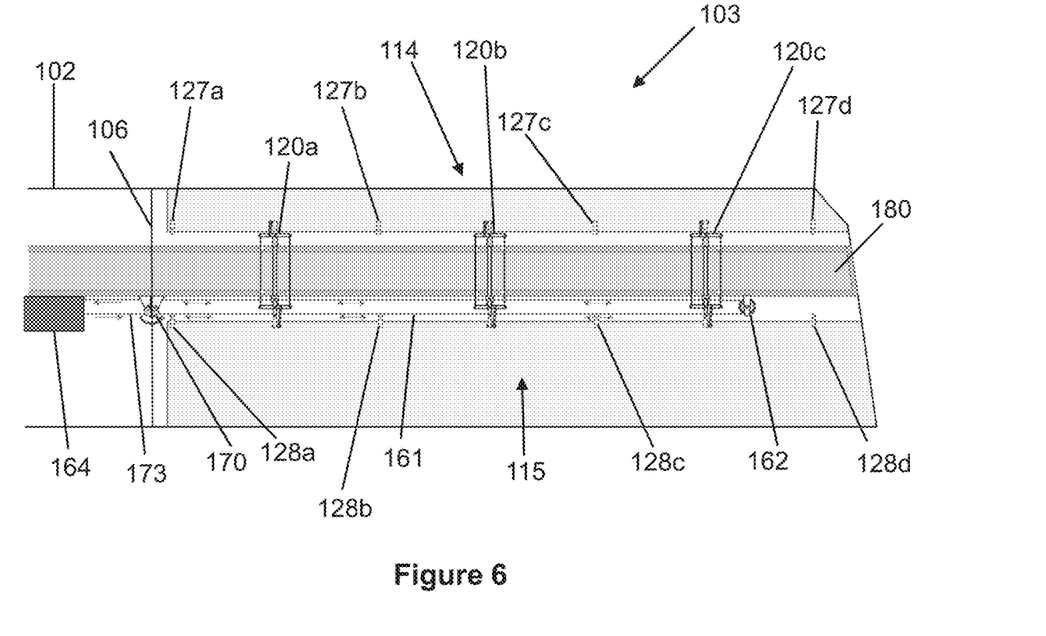
FIG. 6 shows a cross-sectional plan view of the wing tip portion of FIG. 1, showing a plurality of movement mechanisms, and an actuation mechanism.
Figure 8:
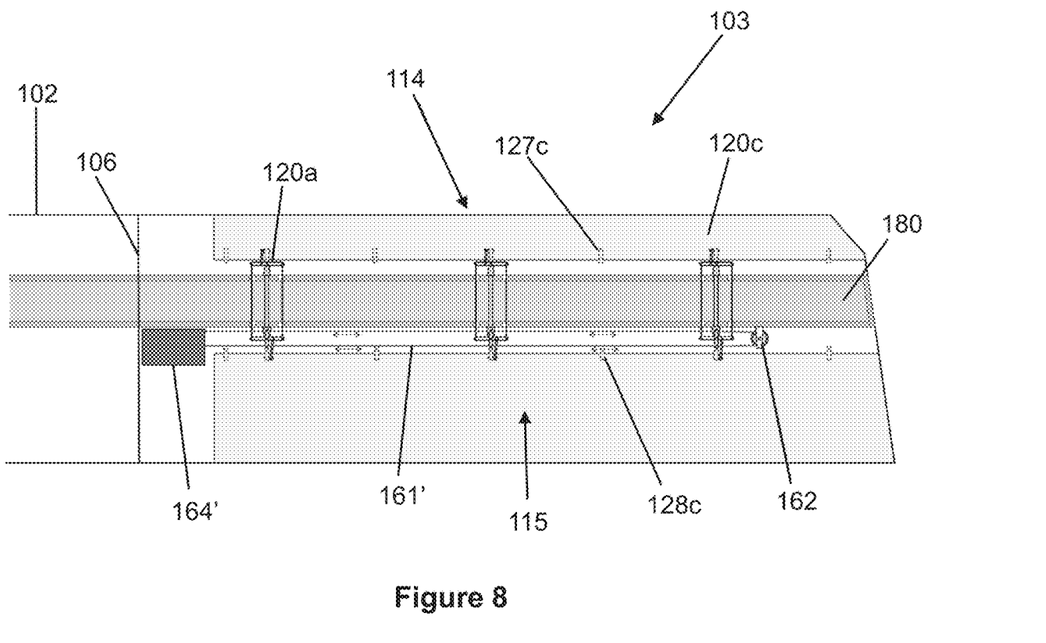
FIG. 8 shows a cross-sectional plan view of a wing tip portion in a third embodiment, showing a plurality of movement mechanisms, and an actuation mechanism.

Going back to consider the cable mechanism 160 in more detail. This cable mechanism comprises a steel tensioned cable 161 looped around a pulley 162 (although other materials could be used). The pulley 162 is mounted, using a pulley mount 163 to the trailing side 184 of the box 180. The pulley 162 is mounted at a tip/outboard end of the tip portion 103, as can be seen in FIGS. 6 and 8. At an opposite end of the tip portion 103 to the pulley (or in a main portion 102 of the wing) is a cable actuator 164, which will be described later, in relation to FIGS. 6 and 8. This cable actuator 164 moves the cable 161 back and forth between a first position and second position over the pulley.

In FIGS. 2a and 2b, the cable 161 is in an intermediate position, halfway between the two extreme positions. In this position, the cable-mounting points 134, 135 are in a position such that the first crank lever 130 is perpendicular to the trailing side 184 and the second crank lever 140 is parallel to the trailing side 184 of the box 180. In this position, the intermediate location 144 of the second crank lever 140 is an intermediate distance spaced apart from the trailing side 184. Hence, the position of the connecting link 150 and pivot bar 154 cause the trailing edge cambering device 115 to be in a neutral configuration, pivoted neither upwards nor downwards.

As mentioned before, cables 191a, 191b extend from the second crank lever 140 through the holes 185a, b, 186a, b of the box 180 to the leading part of the movement mechanism 120. This leading part comprises a crank bar 192, which is pivotally connected to the leading pivot rod 126 at its central location, in a similar way to the second crank lever 140. It is the same length as the second crank lever 140, and the cables 191a, 191b are mounted to the ends of the crank bar 192, again in a similar way to the second crank lever 140. This means that as the second crank lever 140 is pivoted clockwise, the tension on the cable 191a causes the crank bar 192 to also pivot clockwise. When the second crank lever 140 is pivoted anti-clockwise, the tension on the cable 191b causes the crank bar 192 to also pivot anti-clockwise.

The crank bar 192 pivotally mounts a connecting link 193. This is similar to how the second crank lever 140 mounts the connecting link 150 at intermediate location 144.

Similarly, the connecting link 193 is attached through pivot bar 194 to D-shaped cranks 195, 196. These D-shaped cranks are connected to the leading edge cambering device 144 at pivot point 197 (above the connection of the pivot bar 194 to the D-shaped cranks 195, 196). Hence, when the pivot bar 194 is pushed towards the leading edge cambering device 114, the D-cranks 195, 196 pivot upwards and vice versa. The leading edge cambering device 114 is mounted to the D-cranks 195, 196 and so when they pivot, the leading edge cambering device 114 also pivots. It is noted that on the upper and lower wing skins of the leading edge cambering device 114, at a region adjacent the rest of the tip portion 103, are flexible sections of skin made out of CFRP (by winding fibres), denoted by label 198. The rest of the cambering device 114 comprises a fixed internal structure 199.

Importantly, the pivotal mounting of the connecting link 193 is on the opposite side of the support rod 121 to the intermediate location 144. This can be seen in FIG. 2b. This means that as the second crank lever 140 is pivoted clockwise and the pivot bar 154 is pushed out towards the trailing edge cambering device 115 (causing the trailing edge cambering device 115 to pivot upwards), the crank bar 192 is pivoted clockwise and the pivot bar 197 is pushed out towards the leading edge cambering device 114 (also causing the leading edge cambering device 114 to pivot upwards).

Hence, as the trailing edge cambering device 115 is pivoted upwards, so too is the leading edge cambering device 114. Similarly, as the trailing edge cambering device 115 is pivoted downwards, so too is the leading edge cambering device 114.

Figure 3A:
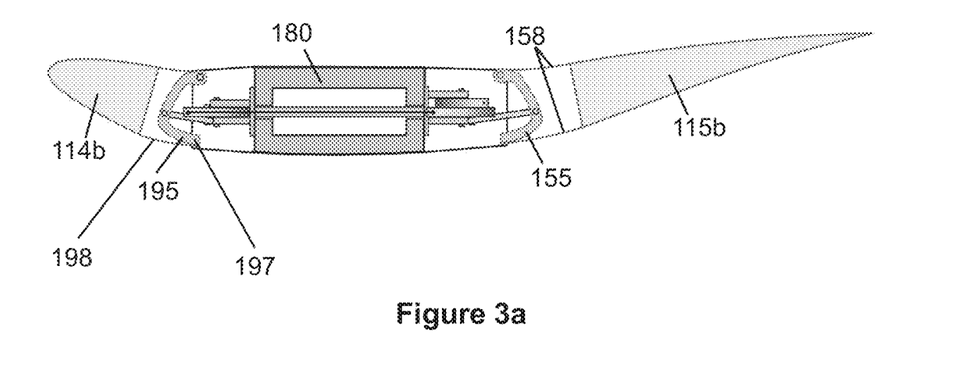
FIG. 3a shows a cross-sectional side view of the tip portion of the wing of FIG. 1, with leading and trailing edge cambering devices in an upwardly deflected configuration.
Figure 3B:
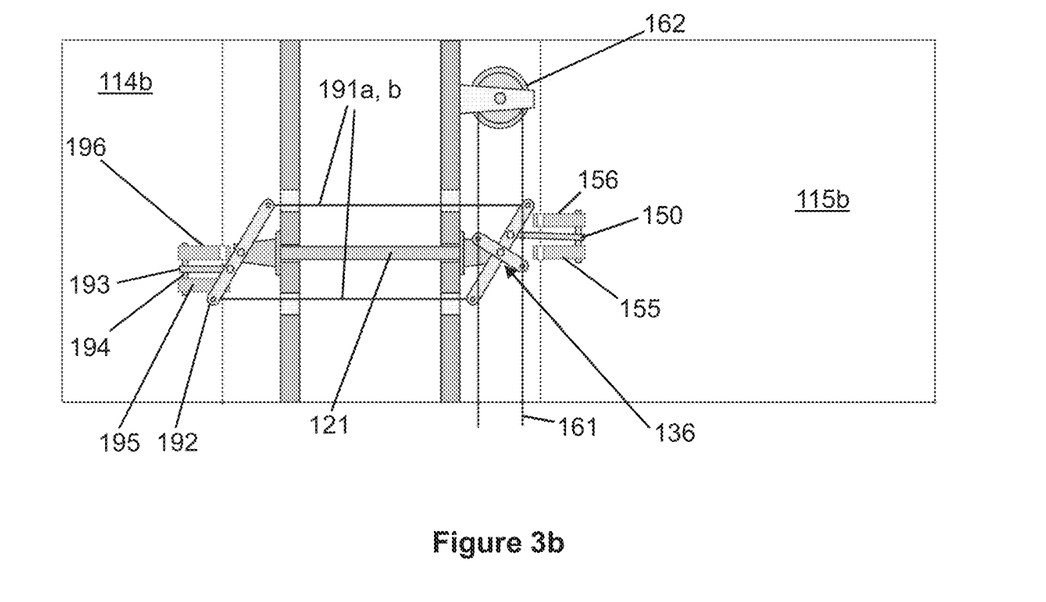
FIG. 3b shows a cross-sectional plan view of the tip portion of FIG. 3a, showing the movement mechanism for moving the leading and trailing edge cambering devices.

FIG. 3a shows a cross-sectional side view of the tip portion 103 of the wing of FIG. 1, with leading and trailing edge cambering devices in an upwardly deflected configuration, labelled as 114b and 115b respectively. FIG. 3b shows a cross-sectional plan view of the tip portion of FIG. 3a.

Here, the cable 161 has been pulled by the cable actuator 164 so as to rotate clockwise around the pulley 162. This causes the cable-mounting points 134, 135 to pivot the first and second crank levers 130, 140 clockwise.

This causes two things: Firstly, the connecting link 150 pushes the pivot bar 154 outwards towards the trailing edge cambering device 115, causing it to pivot upwards to its upwardly deflected configuration 115b. Secondly, the cable 191a pulls on crank bar 192 to pivot it clockwise, causing the pivot bar 194 to be pushed towards the leading edge cambering device 114, thus causing the leading edge cambering device 114 to also be pivoted upwards to its upwardly deflected configuration 114b.

Figure 4A:
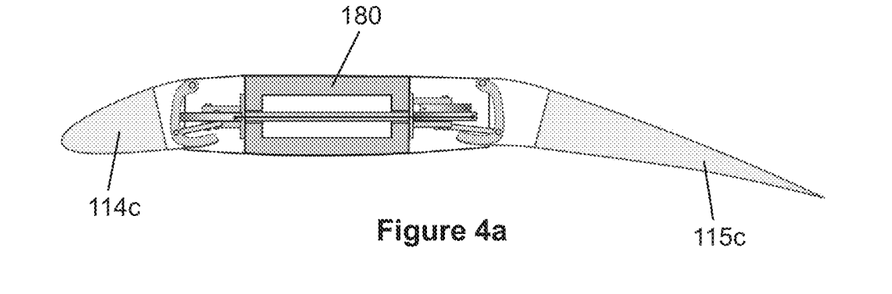
FIG. 4a shows a cross-sectional side view of the tip portion of the wing of FIG. 1, with leading and trailing edge cambering devices in a downwardly deflected configuration.
Figure 4B:
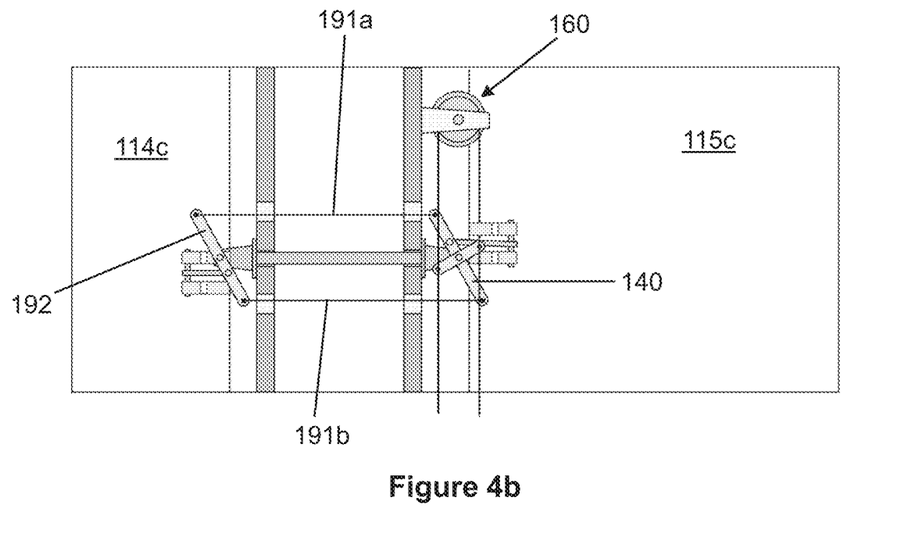
FIG. 4b shows a cross-sectional plan view of the tip portion of FIG. 4a, showing the movement mechanism for moving the leading and trailing edge cambering devices.

FIG. 4a shows a cross-sectional side view of the tip portion of the wing of FIG. 1, with leading and trailing edge cambering devices in a downwardly deflected configuration, labelled as 114c and 115c respectively. FIG. 4b shows a cross-sectional plan view of the tip portion of FIG. 4a.

Here, the cable 161 has been pulled by the cable actuator 164 so as to rotate anti-clockwise around the pulley 162. This causes the cable-mounting points 134, 135 to pivot the first and second crank levers 130, 140 anti-clockwise.

This causes two things: Firstly, the connecting link 150 pulls the pivot bar 154 inwards away from the trailing edge cambering device 115, causing it to pivot downwards to its downwardly deflected configuration 115c. Secondly, the cable 191b pulls on crank bar 192 to pivot it anti-clockwise, causing the pivot bar 194 to be pulled inwards away from the leading edge cambering device 114, thus causing the leading edge cambering device 114 to also be pivoted downwards to its downwardly deflected configuration 114b.

Figure 5:
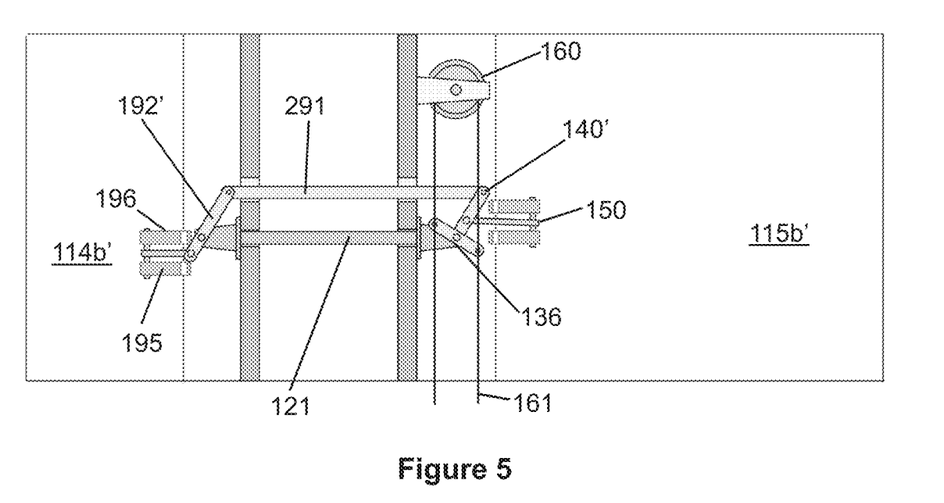
FIG. 5 shows cross-sectional plan view of a different movement mechanism that could be used in a second embodiment.

FIG. 5 shows cross-sectional plan view of a different movement mechanism that could be used in a second embodiment. The movement mechanism and other elements are similar to that of the first embodiment, and the same reference numerals will be used. Only the differences will be described below, using the same reference numerals, preceded by a 2, instead of a 1.

Here, cable 191b and associated holes 185b and 186b are not present. The crank bar 192 and second crank lever 140 are correspondingly shortened as the relevant cable-mounting points (e.g. 146 on second crank lever 140) are not present. Cable 191a is replaced by a connection rod 291. This rod 291 transmits tension and compression between the second crank lever 140 and crank bar 192.

Hence, when the cable 161 has been pulled by the cable actuator 164 so as to rotate clockwise around the pulley 162 and causes the cable-mounting points 134, 135 to pivot the first and second crank levers 130, 140 clockwise, the trailing edge cambering device is pivoted upwards, as in FIGS. 3a and 3b. However, the connection rod 291 (rather than cable 191a) pulls on the crank bar 192 to pivot it clockwise, causing the leading edge cambering device 114 to also be pivoted upwards.

When the cable 161 has been pulled by the cable actuator 164 so as to rotate anti-clockwise around the pulley 162 and causes the cable-mounting points 134, 135 to pivot the first and second crank levers 130, 140 anti-clockwise, the trailing edge cambering device is pivoted downwards, as in FIGS. 4a and 4b. However, the connection rod 292 also pushes on the crank bar 192 to pivot it anti-clockwise, causing the leading edge cambering device 114 to also be pivoted downwards.

FIG. 6 shows a cross-sectional plan view of the wing tip portion 103 of FIG. 1, showing a plurality of movement mechanisms, corresponding to movement mechanism 120, and an actuation mechanism, comprising the cable actuator 164.

In particular, there are three sets of the movement mechanisms and support rods etc. evenly distributed along the span length of the wing tip portion 103, outboard of the fold line 106. These are labelled as 120 a, b and c. The movement mechanism 120 previously described, adjacent to the pulley 162 is movement mechanism 120c in FIG. 6. Additional movement mechanisms etc. 120a and b are inboard of the outermost mechanism 120c. They distribute the hinge-moment load along the span of the cambering devices 114, 115 and the rest of the wing tip portion 103.

Further, there are a number of additional pivotal D-shaped cranks (similar to 155 and 195) between the leading edge cambering device 114 and the rest of the wing tip portion 103 and the trailing edge cambering device 115 and the rest of the wing tip portion 103. These are labelled as 127 a to d and 128 a to d, respectively. These serve as additional hinges to support the structural connection between the wing tip portion 103 and leading and trailing edge cambering devices 114 and 115, and maintain the desired pivoting kinematics of the devices 114 and 115 along their respective spanwise lengths. Hence, there are in total seven connection points between each of the leading edge 114 and trailing edge 115 cambering devices and the rest of the wing tip portion 103.

As can be seen in FIG. 6, the cable 161 is looped around the pulley 162, which is located outboard of the outermost movement mechanism 120c. It is attached to all three movement mechanisms 120 a to c in the way described above for movement mechanism 120/120c. In particular, the cable 161 is attached at two cable-mounting points 134, 135 to the first crank lever 130 of each movement mechanism 120. Hence, as the cable 161 is moved around the pulley, the causes both the cable-mounting points 134, 135 on all movement mechanisms 120 to move simultaneously, and so move the cambering devices 114, 115 from all three movement mechanisms 120 simultaneously.

The cable 161 is actuated by a cable actuator 164. This actuator 164 moves the cable 161 between its two extreme positions, corresponding to the extreme (upward and downward) positions of the cambering devices 114, 115.

Importantly, in FIG. 6, the cable actuator 164 is inboard of the fold line 106 of the wing 100. Hence, there is a cable link mechanism 170 to link the cable actuator 164 to the cable 161, as will now be described, with reference to FIG. 7a, which is a plan view showing a cable link mechanism 170 in a disconnected configuration.

Figure 7A:
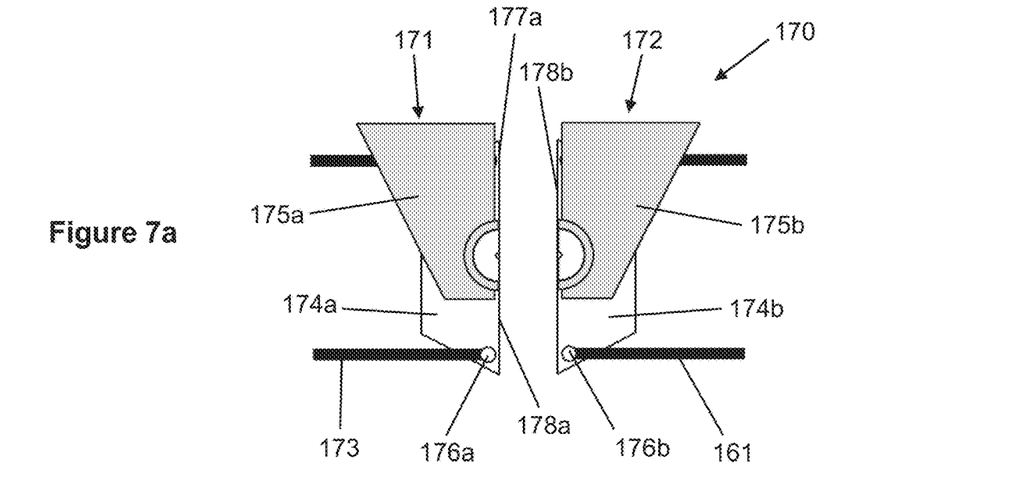
FIG. 7a is a plan view showing a cable link mechanism of the actuation mechanism, in a disconnected configuration.

The cable actuator 164 is attached to a secondary steel cable 173 and moves this cable 173 back and forth when actuating. The secondary cable 173 is connected in two places to a first connection part 171 and causes this first part 171 to change configuration.

The first part 171 comprises an upper fixed section 175a which pivotally mounts a lower part 174a at a central region of the lower section 174a. The upper part 175a is fixed to the main wing portion 102. The lower section 174a has the secondary cable 173 connected (at 176a, 177a) to it at opposite ends such that movement of the cable 173 causes the lower section 174a to pivot with respect to the upper section 175a (and main wing portion 102). The lower section 174a has a straight contact surface 178a facing outboard (although the surface could be any suitable shape, e.g. curved).

This first part 171 abuts against a second part 172 so that the second part 172 also changes configuration when the first part 171 does. This abutment occurs at the fold line 106 so that there is no attachment connection across the fold line 106. The second part 172 is a mirror image of the first part 171 (at the fold line 106). The same reference numerals will be used for the second part, but using a "b" instead of an "a".

The second part upper section 175b is fixedly connected to the wing tip portion 103. Hence, pivoting of the first lower section 174a and the straight surface 178a causes pivoting of the corresponding straight surface 178b on the second part 172 and the pivoting of the second part lower section 174b. The second part 172 is connected in two places (176b, 177b) to the cable 161 and so this also causes the movement of the cable 161. Hence, movement of the cable 173 is reflected by the movement of cable 161.

Figure 7B:
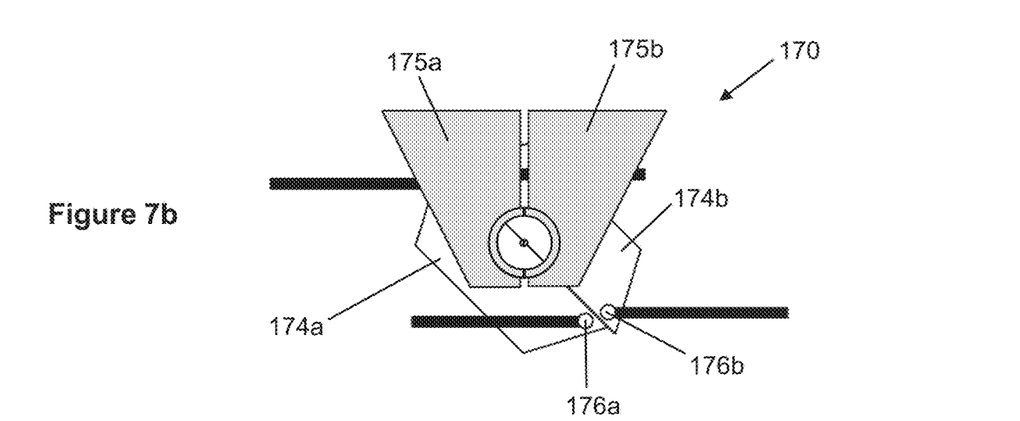
FIG. 7b is a plan view showing the cable link mechanism connected, in the downwardly configuration.

FIG. 7b is a plan view showing the cable link mechanism in an engaged configuration, which corresponds to when the wing is fully unfolded. Parts 174a and b are also partially rotated such that the mechanism is in the downwardly configuration.

Here, the cable actuator 164 has moved the secondary cable 173 causing it to pull on connection point 177a (see arrows on FIG. 6). This has caused the straight surface 178a to pivot anti-clockwise. This also causes the straight surface 178b to pivot anti-clockwise and so pull on connection point 177b. This causes the cable 161 to move anti-clockwise around the pulley 162. Hence, this moves the leading edge 114 and trailing edge 115 cambering devices to move to their downwardly configurations 114c, 115c.

Figure 7C:
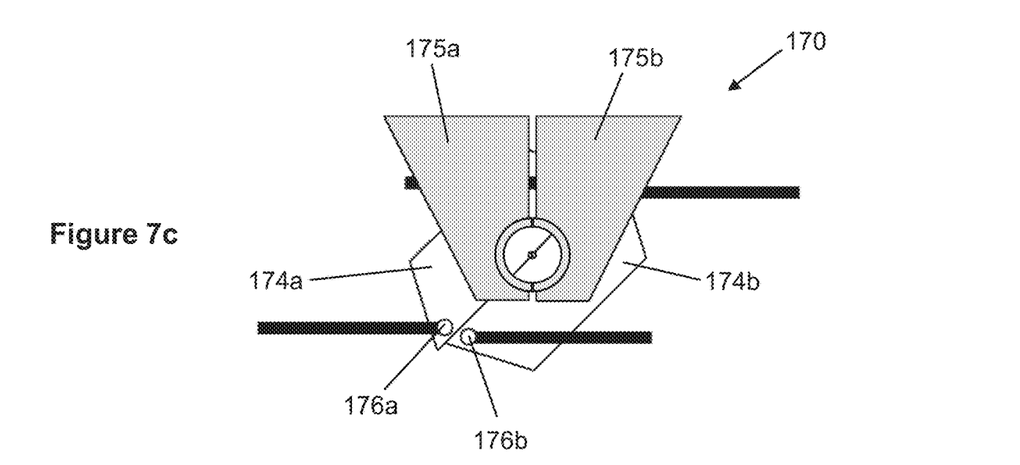
FIG. 7c is a plan view showing the cable link mechanism connected, in the upwardly configuration.

FIG. 7c is a plan view showing the cable link mechanism in the upwardly configuration.

Here, the cable actuator 164 has moved the secondary cable 173 causing it to pull on connection point 176a (reverse of arrows on FIG. 6). This has caused the straight surface 178a to pivot clockwise. This also causes the straight surface 178b to pivot clockwise and so pull on connection point 176b. This causes the cable 161 to move clockwise around the pulley 162. Hence, this moves the leading edge 114 and trailing edge 115 cambering devices to move to their upwardly configurations 114b, 115b.

FIG. 8 shows a cross-sectional plan view of a wing tip portion 103 in a third embodiment, showing the same plurality of movement mechanisms 120, and a different actuation mechanism. This third embodiment is similar to the arrangement of FIG. 6 and so only the differences will be described below. The same reference numerals will be used where the elements are the same. Where the elements are different, the same reference numerals will be used, but suffixed by '.

In FIG. 8, the cable actuator 164' is the same as cable actuator 164 but is located outboard of the fold line 106. It is connected directly to the ends of cable 161' (instead of secondary cable 173) and there is no cable link mechanism 170. Instead, the cable actuator 164' moves the cable 161' directly to move it between its extreme positions, corresponding to the extreme upwardly and downwardly configurations of the cambering devices 114, 115.

Figure 9:
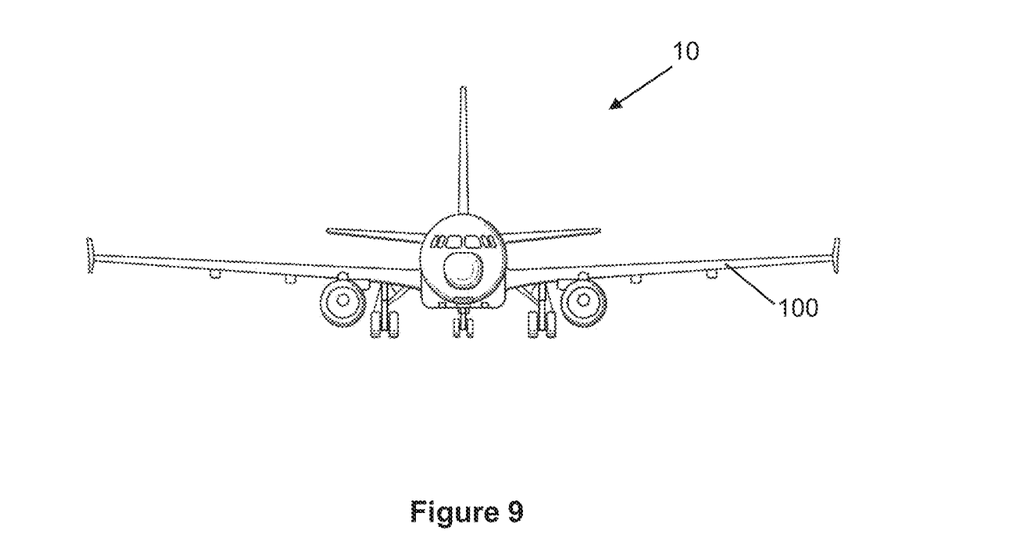
FIG. 9 shows a front view of an aircraft including an aircraft wing, suitable for being provided with the wing according to any of the above embodiments.

FIG. 9 shows a front view of an aircraft 10 including two aircraft wings, suitable for being the wing 100 according to any of the above embodiments.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The pivot points of the D-cranks to the rest of the wing tip portion may be above or below the pivot points of the pivot rods. In other words, the D-cranks could be mounted to the lower skin, rather than the upper skin.

Any suitable shape cranks, pivot rods, levers, bars etc. could be used.

The pulley cable could be replaced with an actuation rod that is moved back and forth between the extreme positions/configurations.

The flexible skin of the leading and/or trailing edge could be made from any suitable material. Alternatively, one or both of them may be replaced with a hinge, such as a lug-pivot hinge.

The cable etc. or other actuation system may be located in the leading edge, instead of the trailing edge.

The cable (or rod etc.) actuator may be located further inboard in the wing than shown in FIG. 6 or 8. However, it is advisable to locate it in a region of the wing that does not store fuel (i.e. a "dry area"). Alternatively, the actuator may be located further outboard than shown in FIG. 6 or 8.

A tapered wing and/or tapered wing box could be used, rather than the un-tapered planform shown in FIG. 6 or 8. In the case of a tapered wing, each mechanism could be adjusted to provide the desired leading edge and trailing edge cambering device deflection along the span. The mechanisms could also be adjusted to vary the magnitude of leading edge and trailing edge cambering device deflection along the span to achieve the desired variation in lift distribution.

The different support rods of the mechanisms could be designed to take a different balance of load (between the support rod and the wing box) along the span of the wing tip.

One or more (including all) of the support rods may be pre-tensioned (e.g. through means of a screw). If pre-tensioned, they may act to secure the structural spine with pins (extending from the stoppers into the box sides, rather than with nuts and bolts). This would aid assembly.

The (relative vertical) positions of the support rods can be tuned to achieve a desired structural response in conjunction with the stiffness of the structural spine.

The position at which each connecting link joins to the D-shaped cranks could vary to allow varying magnitudes of camber along the span of the wing tip portion. This could also provide the desired magnitudes of leading edge and/or trailing edge deflection along the span of a tapered wing. This could also be used to vary the leverage within the mechanisms at each spanwise location in order to balance the forces and enable all mechanisms to be actuated with the same cable force.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

It should be noted that throughout this specification, "or" should be interpreted as "and/or".

The invention claimed is:

1. An aircraft wing section assembly, comprising:
   a structural spine extending in a spanwise direction of the wing section, and
   a movement mechanism comprising:
      a support rod extending in a chordwise direction of the wing section, through the structural spine, from a first end to a second end,
      a first lever, for connection to and for moving a first moveable control surface, pivotally mounted to the first end of the support rod, for pivotal movement with respect to the support rod,
      a second lever, for connection to and for moving a second moveable control surface, pivotally mounted to the second end of the support rod, for pivotal movement with respect to the support rod,
      an actuation mechanism for actuating pivotal movement of the first lever with respect to the support rod, and
      an elongate member extending in a spanwise direction connected to the first lever at a first connection point for pulling the first connection point to pivotally move the first lever with respect to the support rod and to cause the second lever also to pivotally move with respect to the support rod, thus causing movement of both the first and second moveable control surfaces.

2. An aircraft wing section assembly as claimed in claim 1, wherein the structural spine comprises a monolithic box structure.

3. An aircraft wing section assembly as claimed in claim 1, wherein the support rod comprises an elongate section extending internally through the structural spine between the first and second ends, wherein the first end comprises a first end stopper located adjacent to a first external side of the structural spine for preventing the first end from moving in a first direction through the first side, and wherein the second end comprises a second end stopper located adjacent to a second, opposite external side of the structural spine for preventing the second end from moving in a second direction, opposite to the first direction, through the second side.

4. An aircraft wing section assembly as claimed in claim 1, wherein the elongate member is connected to a pull mechanism for pulling the elongate member such that the first connection point moves.

5. An aircraft wing section assembly as claimed in claim 4, wherein the elongate member is in the form of a cable.

6. An aircraft wing section assembly as claimed in claim 1, wherein the elongate member is in the form of a cable and the actuation mechanism further comprises a pulley and wherein the cable extends around the pulley.

7. An aircraft wing section assembly as claimed in claim 6, wherein the cable is also connected to the first lever at a second connection point which is on an opposite side of the pulley to the first connection point, such that when the cable is pulled, the first connection point moves in a first direction and the second connection point moves in a second opposite direction.

8. An aircraft wing section assembly as claimed in claim 1, wherein the elongate member is also connected to the first lever at a second connection point, such that when the elongate member is pulled to move the first connection point in a first direction, the second connection point moves in a second opposite direction.

9. An aircraft wing section assembly as claimed in claim 1, wherein the actuation mechanism comprises a crank lever, mounted to the first lever such that it extends transverse to the first lever and wherein the first connection point is located on a first end of the crank lever, the first end of the crank lever being located to a first transverse side of the first lever.

10. An aircraft wing section assembly as claimed in claim 9, wherein the second connection point is located on a second opposite end of the crank lever, the second opposite end of the crank lever being located to a second, opposite transverse side of the first lever.

11. An aircraft wing section assembly as claimed in claim 1, wherein the elongate member is part of a movement mechanism which further comprises a connection mechanism for connecting the first and second levers such that pivotal movement of the first lever with respect to the support rod causes pivotal movement of the second lever with respect to the support rod.

12. An aircraft wing section assembly as claimed in claim 11, wherein the connection mechanism comprises at least one connector extending in a chordwise direction of the wing section, through the structural spine.

13. An aircraft wing section assembly as claimed in claim 12, wherein the connection mechanism comprises a second connector extending in a chordwise direction of the wing section, through the structural spine.

14. An aircraft wing section assembly as claimed in claim 1, wherein the first lever is part of a first lever mechanism for connection to the first moveable control surface, and wherein the first lever mechanism also comprises a connecting link pivotally mounted to the first lever at a connecting link connection point.

15. An aircraft wing section assembly as claimed in claim 14, wherein the connecting link connection point is closer to the point of pivotal mounting of the first lever to the support rod than the location of the first connection point.

16. An aircraft wing section assembly as claimed in claim 14, wherein the first lever mechanism further comprises a D-shaped crank pivotally connected to the structural spine and connected to the connecting link such that movement of the connecting link causes the D-shaped crank to pivot with respect to the structural spine.

17. An aircraft wing section assembly as claimed in claim 1, wherein in addition to said movement mechanism there are one or more further movement mechanisms each with its own support rod, first lever, and second lever, the movement mechanisms all being spaced apart along the structural spine in the spanwise direction and all being controlled and moved by the same actuation mechanism.

18. An aircraft wing section assembly as claimed in claim 1, further comprising a first moveable control surface connected to the first lever and a second moveable control surface connected to the second lever, wherein one or both of the moveable control surfaces comprise a flexible skin adjacent to connection of the surface to the lever.

19. An aircraft wing assembly including the aircraft wing section assembly of claim 1, wherein the aircraft wing section assembly is located at a tip portion of the aircraft wing assembly.

20. An aircraft wing assembly as claimed in claim 19, comprising a foldable wing tip portion being foldable about a fold line and wherein the aircraft wing section assembly is located in the foldable wing tip portion, such that it is located outboard of the fold line.

21. An aircraft wing assembly as claimed in claim 20, wherein the elongate member is connected to a pull mechanism for pulling the elongate member such that the first connection point moves, the pull mechanism being located outboard of the fold line.

22. An aircraft wing assembly as claimed in claim 20, wherein the elongate member includes a cable outboard of the fold line, there being a pull mechanism for pulling the cable such that the first connection point moves, the pull mechanism being located inboard of the fold line, and wherein the pull mechanism includes a cable link transfer mechanism to transfer movement of a cable inboard of the fold line into movement of the cable outboard of the fold line.

23. An aircraft comprising the aircraft wing section assembly or aircraft wing assembly of claim 1.

24. A method of operating an aircraft, comprising the following steps:
   providing a wing section with a structural spine extending in a spanwise direction of the wing section,
   providing a support rod extending in a chordwise direction of the wing section, through the structural spine, from a first end to a second end, and
   actuating an actuation mechanism by using an elongate member extending in the spanwise direction to pull on a first lever at a first connection point, thereby causing the first lever to pivot with respect to the support rod, thereby causing:
      a first moveable wing control surface connected to the first lever to move, and
      a connection mechanism, connected to the first lever and a second lever, to move, thereby causing:
         the second lever to pivot with respect to the support rod, thereby causing a second moveable wing control surface connected to the second lever to move.

* * * * *